United States Patent
Han et al.

(10) Patent No.: US 7,816,416 B2
(45) Date of Patent: Oct. 19, 2010

(54) POLYMER MEMBRANE FOR FUEL CELL, METHOD OF PREPARING THE SAME, MEMBRANE-ELECTRODE ASSEMBLY INCLUDING THE SAME, AND FUEL CELL SYSTEM INCLUDING THE SAME

(75) Inventors: Sang-Il Han, Suwon-si (KR); In-Hyuk Son, Suwon-si (KR); Chan-Gyun Shin, Suwon-si (KR); Chang-Bong Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 12/654,768

(22) Filed: Dec. 31, 2009

(65) Prior Publication Data

US 2010/0112409 A1    May 6, 2010

Related U.S. Application Data

(62) Division of application No. 11/546,392, filed on Oct. 12, 2006, now Pat. No. 7,659,318.

(30) Foreign Application Priority Data

Oct. 12, 2005    (KR) .................... 10-2005-0096071

(51) Int. Cl.
    *C08J 5/20*    (2006.01)

(52) U.S. Cl. ............... 521/27; 525/192; 429/13; 429/30; 429/33

(58) Field of Classification Search ............. 521/27; 525/192; 429/13, 30, 33
    See application file for complete search history.

(56) References Cited

U.S. PATENT DOCUMENTS

| | | | |
|---|---|---|---|
| 5,523,181 | A | 6/1996 | Stonehart et al. |
| 6,610,789 | B2 | 8/2003 | Watakabe et al. |
| 7,108,935 | B2 | 9/2006 | Bauer et al. |
| 2005/0003255 | A1 | 1/2005 | Shimizu et al. |
| 2005/0053822 | A1 | 3/2005 | Miyake et al. |
| 2006/0034757 | A1 | 2/2006 | Yan et al. |
| 2006/0083962 | A1 | 4/2006 | Takekawa et al. |
| 2008/0213646 | A1 | 9/2008 | Takekawa et al. |

*Primary Examiner*—Bernard Lipman
(74) *Attorney, Agent, or Firm*—Robert E. Bushnell, Esq.

(57) ABSTRACT

The present invention relates to a polymer electrolyte membrane for a fuel cell, a method for manufacturing the polymer electrolyte membrane, a membrane-electrode assembly for a fuel cell including the polymer electrolyte membrane, and a fuel cell system including the membrane-electrode assembly. The polymer electrolyte membrane includes a proton-conductive polymer membrane including a polymer micelle inside a hydrophilic channel. Herein, the micelle includes a vinyl-based polymer obtained from polymerization of a vinyl-based monomer and an anionic surfactant surrounding the vinyl-based polymer.

6 Claims, 3 Drawing Sheets

POLYMER MEMBRANE FOR FUEL CELL, METHOD OF PREPARING THE SAME, MEMBRANE-ELECTRODE ASSEMBLY INCLUDING THE SAME, AND FUEL CELL SYSTEM INCLUDING THE SAME

CROSS-REFERENCE TO RELATED APPLICATIONS AND CLAIM OF PRIORITY

This application is a divisional of Applicant's Ser. No. 11/546,392 filed in the U.S. Patent & Trademark Office on 12 Oct. 2006, now U.S. Pat. No. 7,659,318, and assigned to the assignee of the present invention. Furthermore, this application makes reference to, incorporates the same herein, and claims all benefits accruing under 35 U.S.C. §119 from an application for POLYMER MEMBRANE FOR FUEL-CELL, METHOD OF PREPARING THE SAME, MEMBRANE-ELECTRODE ASSEMBLY COMPRISING THE SAME, AND FUEL CELL SYSTEM COMPRISING THE SAME, earlier filed in the Korean Intellectual Property Office on the $12^{th}$ of October, 2005 and there duly assigned Serial No. 10-2005-0096071.

BACKGROUND OF THE INVENTION

1. Field of the Invention

The present invention relates to a polymer electrolyte membrane for a fuel cell, a method for manufacturing the polymer electrolyte membrane, and a membrane-electrode assembly incorporating the polymer electrolyte membrane for a fuel cell and a fuel cell system incorporating the membrane-electrode assembly. More particularly, the present invention relates to a polymer electrolyte membrane having large moisture retention and fuel cross-over inhibition properties and a method for manufacturing the polymer electrolyte membrane, and a membrane-electrode assembly incorporating the polymer electrolyte membrane for a fuel cell and a fuel cell system incorporating the membrane-electrode assembly.

2. Description of the Related Art

A fuel cell is a power generation system for producing electrical energy through an electrochemical redox reaction between an oxidant and a fuel such as hydrogen, or a hydrocarbon-based material such as methanol, ethanol, and natural gas.

Such a fuel cell is a clean energy source that can replace fossil fuels. The fuel cell is typically constructed with a stack composed of unit cells that produces various ranges of power output. Since it has an approximately four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has advantages of high energy density and high power, but it also has problems in the need for exceptionally careful handling of hydrogen gas and in its requirement for accessory facilities such as a fuel reforming processor for reforming methane or methanol, natural gas, and the like in order to produce hydrogen as the fuel gas.

On the contrary, a direct oxidation fuel cell has a lower energy density than that of the gas-type fuel cell but has the advantages of easy handling of the liquid-type fuel, a low operation temperature, and no need for additional fuel reforming processors. Therefore, it has been acknowledged as an appropriate system for a portable power source for small and common electrical equipment.

In the above-mentioned fuel cell system, the stack that generates electricity substantially includes several to scores of unit cells stacked adjacent to one another, and each unit cell is constructed with a membrane-electrode assembly (MEA) and a separator (also referred to as a bipolar plate). The membrane-electrode assembly is constructed with an anode (also referred to as a "fuel electrode" or an "oxidation electrode") and a cathode (also referred to as an "air electrode" or a "reduction electrode") that are separated by a polymer electrolyte membrane.

A fuel is supplied to the anode and is adsorbed on catalysts of the anode, and the fuel is oxidized to produce protons and electrons. The electrons are transferred into the cathode via an 11 external circuit, and the protons are transferred into the cathode through the polymer electrolyte membrane. In addition, an oxidant is supplied to the cathode, and then the oxidant, protons, and electrons react on the catalyst of the cathode to produce electricity along with water.

SUMMARY OF THE INVENTION

It is therefore an object of the present invention to provide an improved fuel cell system.

It is another object to provide an improved polymer electrolyte membrane for a fuel cell system.

It is yet another object to provide a polymer electrolyte membrane having smaller, but more densely distributed internal channels to improve proton conductivity and to suppress cross-over of a fuel through the polymer electrolyte membrane.

It is still another object to provide a polymer electrolyte membrane for a fuel cell that includes polymer micelles inside a water ion cluster that thereby improve moisture retention and fuel cross-over inhibition properties.

It is still yet another object to provide a method for manufacturing the polymer electrolyte membrane using an emulsion polymerization.

It is a further object to provide a membrane-electrode assembly including the polymer electrolyte membrane.

It is a still further object to provide a fuel cell system including the polymer electrolyte membrane for a fuel cell.

According to one embodiment of the present invention, a polymer electrolyte membrane is provided with a polymer micelle inside a hydrophilic channel of a proton-conductive polymer membrane. The polymer micelle includes a vinyl-based polymer obtained from polymerization of vinyl-based monomers and an anionic surfactant surrounding the vinyl-based polymer.

According to another embodiment of the present invention, a method for manufacturing a polymer electrolyte membrane is provided to prepare an emulsion polymerization solution by mixing a vinyl-based monomer, an anionic surfactant, and a radical polymerization initiator in water, to dip a proton-conductive polymer membrane in the emulsion polymerization solution to swell the membrane, and to perform an emulsion polymerization of the monomer embedded inside the swelled proton-conductive polymer membrane to form a polymer micelle.

According to yet another embodiment of the present invention, a membrane-electrode assembly for a fuel cell is provided with this polymer electrolyte membrane, a cathode at one side of the polymer electrolyte membrane, and an anode at the other side of the polymer electrolyte membrane.

According to still another embodiment of the present invention, a fuel cell system is provided with an electricity generating element, a fuel supplier, and an oxidant supplier. The electricity generating element includes a membrane-electrode assembly and a separator positioned on each side of the membrane-electrode assembly. The membrane-electrode assembly includes this polymer electrolyte membrane, a cathode at one side of the polymer electrolyte membrane, and an anode at the other side of the polymer electrolyte membrane.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
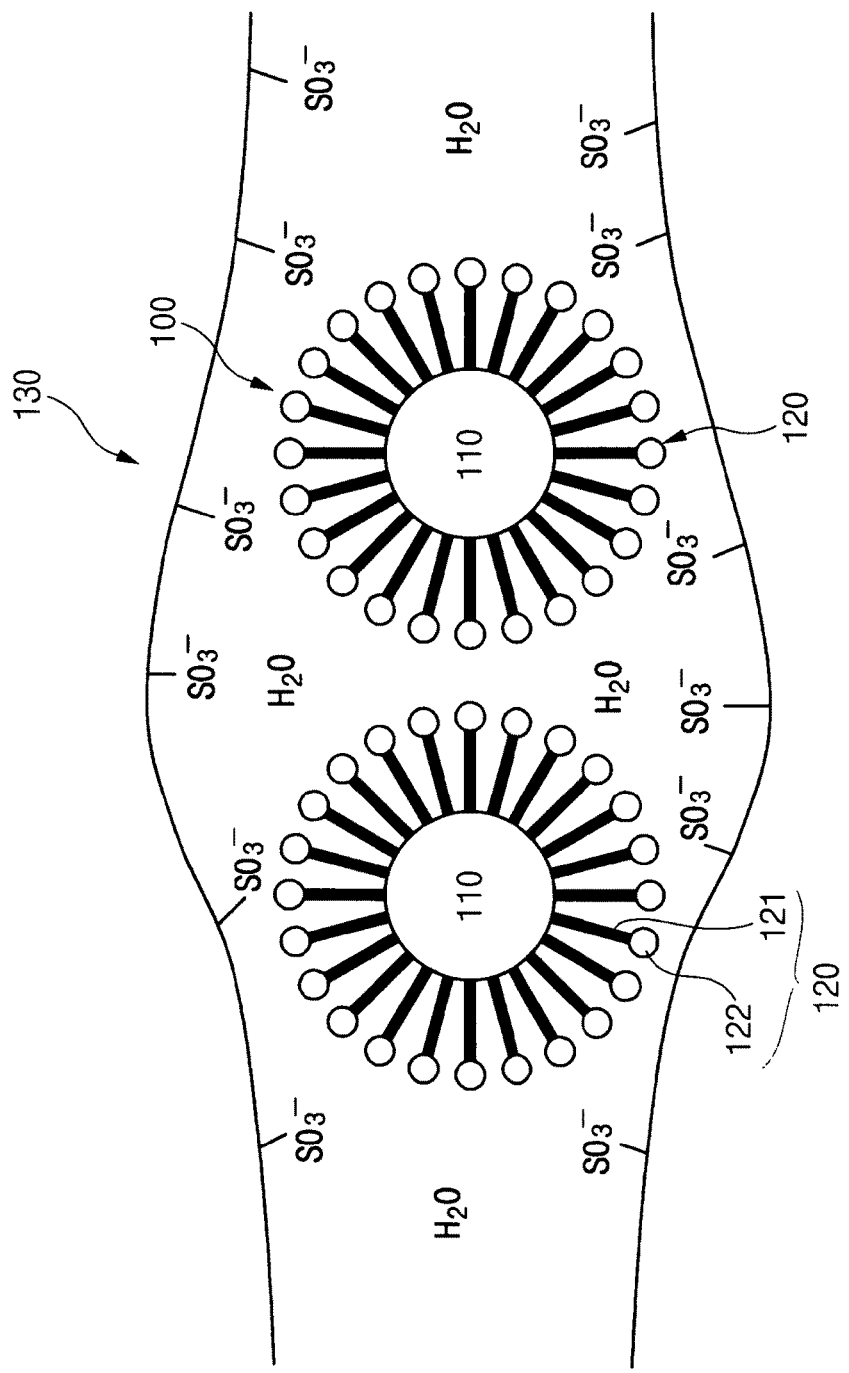
FIG. 1 is a schematic diagram illustrating a polymer micelle included inside a hydrophilic channel of a polymer electrolyte membrane as one embodiment according to the principles of the present invention.

In a fuel cell system, a fuel is supplied to an anode and is adsorbed on catalysts of the anode, and the fuel is oxidized to produce protons and electrons. The electrons are transferred into a cathode via an external circuit, and the protons are also transferred into the cathode through the polymer electrolyte membrane. In addition, an oxidant is supplied to the cathode, and then the oxidant, protons, and electrons react on the catalyst of the cathode to produce electricity along with water. The electrochemical reactions between the fuel and the oxidant can be represented by the following formulas.

Anode: $H_2 \rightarrow 2H^+ + 2e^-$ 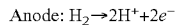

Cathode: $\frac{1}{2}O_2 + 2H^+ + 2e^- \rightarrow H_2O$ 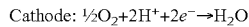

Total: $H_2 + \frac{1}{2}O_2 \rightarrow H_2O + \text{electric current} + \text{heat}$ [Formula 1] 

A direct oxidation fuel cell (DOFC), in particular, a direct methanol fuel cell which uses methanol as a fuel, is commonly constructed with a NAFION-based (NAFION™ is available from E.I. DuPont de Nemours and Co.) membrane as a polymer electrolyte membrane. When methanol in a high concentration is used as a fuel, however, it may cross over the NAFION-based membrane, thereby deteriorating the battery's performance. In addition, the NAFION-based membrane can be swollen by the fuel that crosses over the membrane, and the catalyst of the cathode may be peeled off from the NAFION-based membrane by the over-crossed fuel.

Exemplary embodiments of the present invention will hereinafter be described in detail with reference to the accompanying drawings.

According to an embodiment of the present invention, a polymer electrolyte membrane for a fuel cell includes a micelle inside a hydrophilic channel of the proton-conductive polymer membrane. The micelle refers to an aggregate of surfactant molecules in which several to tens of surfactant molecules are stably dispersed with a hydrophobic group consisting of the molecule disposed inward and a hydrophilic group consisting of the molecule disposed outward, since the absorption of a hydrophilic material and a hydrophobic material is saturated on the interface between the hydrophilic material and the hydrophobic material, and also, excessive surfactant molecules in water decrease resistance between the water and the hydrophobic material when the surfactant reaches a concentration. The surfactant refers to a wetting agent that lowers the surface tension of a liquid, allowing easier spreading of the liquid, and lower the interfacial tension between two liquids.

A micelle is formed when a variety of molecules are added to water. The molecule must have a strongly polar "head" and a non-polar hydrocarbon chain "tail". When this type of molecule is added to water, the non-polar tails of the molecules clump into the center of a ball like structure which is called a micelle, because they are hydrophobic or "water hating". The polar heads of the molecules presents themselves for interaction with the water molecules on the outside of the micelle. A typical micelle in aqueous solution forms a roughly spherical or globular aggregate with the hydrophilic "head" regions in contact with surrounding solvent, sequestering the hydrophobic tail regions in the micelle center. Micelles are often globular and roughly spherical in shape, but ellipsoids, cylinders, and bi-layers are also possible. The shape of a micelle is a function of the molecular geometry of its surfactant molecules and solution conditions such as surfactant concentration, temperature, pH, and ionic strength. Individual surfactant molecules that are in the colloid but are not part of a micelle are called "monomers". In water, the hydrophilic "heads" of surfactant molecules are always in contact with bulk solvent, regardless of whether the surfactants exist as monomers or as part of a micelle. However, the hydrophobic "tails" of surfactant molecules have less contact with water when they are part of a micelle. In a micelle, the hydrophobic tails of several surfactant molecules assemble into an oil-like core that has less contact with water.

In general, when a polymer electrolyte membrane, particularly a NAFION-based membrane, is swollen by water, a water ionic cluster (WIC) is formed in an inverse micelle structure, in which hydrophilic $-SO_3^-$ ions are attached to a main chain of a polymer and surround a water pool. An inverse micelle structure indicates a molecular aggregate in which the molecules are dispersed with a hydrophilic group inward and a hydrophobic group outward. The water ionic cluster (WIC) permeates into the polymer electrolyte membrane, and then forms a hydrophilic channel, which is a hydrogen ion conductive channel, for transferring a proton therethrough. When the channel becomes large, however, a fuel from the anode of the membrane-electrode assembly may cross over the polymer electrolyte membrane to the cathode, due to the osmosis drag phenomenon. Osmosis drag is a phenomenon in which water molecules from a region of high potential flow across a partially permeable membrane and into a region of low potential. The partially permeable membrane is permeable to the solvent of the fuel, i.e., water, but is not permeable to the solute.

FIG. 1 schematically shows a polymer micelle included inside a hydrophilic channel of a polymer electrolyte membrane one embodiment according to the principles of the present invention. As shown in FIG. 1, a polymer micelle 100 contains a vinyl-based polymer 110 and an anionic surfactant 120 surrounding vinyl-based polymer 110. In addition, polymer micelle 100 is surrounded with water in a hydrophilic channel 130. Anionic surfactant 120 includes a hydrophobic part 121 facing inwardly toward the center of polymer micelle 100 and a hydrophilic part 122 facing outwardly from the center of polymer micelle 100.

Micelle 100 has an average particle diameter ranging from 1 nm to 10 μm. When the size of micelle 100 is less than 1 nm, micelle 100 might be easily discharged with water through hydrophilic channel 130, while when more than 10 μm, micelle 100 may block hydrophilic channel 130, so that water and protons cannot flow smoothly.

Micelle 100 functions as a barrier to prevent cross-over of a fuel inside hydrophilic channel 130 of the polymer electrolyte membrane because micelle 100 is constructed with a surfactant having a hydrophilic ion group, which may strongly combine with water molecules and, thereby, may hold water.

Vinyl-based polymer 110 constituting micelle 100 is obtained from polymerization of vinyl-based monomers such as styrene, alpha-methyl styrene, 4-methylstyrene, 3,4-dichlorostyrene, methyl metacrylic acid, sodium acrylamide-tert-butyl sulfonate, polyaniline, polypyrrol, and poly thiophene.

Vinyl-based polymer 110 has an average molecular weight ranging from 1000 to 100000. When the average molecular weight of vinyl-based polymer 110 is less than 1000, the size of micelle 100 is too small to be fixed in the membrane, whereas when the average molecular weight of vinyl-based polymer 110 is more than 100000, vinyl-based polymer 110 may be coated on the surface of the polymer electrolyte membrane.

Anionic surfactant 120 constituting micelle 100 may be made from at least one selected from the group consisting of an alkyl fatty acid salt including a C1 to C20 alkyl, an alkylsulfonate including a C1 to C12 alkyl, an alcohol sulfuric acid ester salt including a C1 to C12 alkyl, an alkyl arylsulfonate including a C1 to C12 alkyl, and combinations of these materials. According to one embodiment, a stearic acid (octadecanoic acid) or an alkylsulfonate including a C1 to C12 alkyl may be preferably used.

The polymer electrolyte membrane is made from any proton-conductive polymer that is usually incorporated in a fuel cell.

The proton-conductive polymer may include at least one selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In a preferred embodiment, the proton-conductive polymer includes at least one selected from the group consisting of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone having a proton-conductive functional group, poly(2,2'-(m-phenylene)-5,5'-bibenzimidazole) having a proton-conductive functional group, poly(2,5-benzimidazole) having a proton-conductive functional group, and mixtures of these polymers.

The proton-conductive functional group may include at least one selected from the group consisting of sulfonic acid, sulfonate, carboxylic acid, carboxylate, phosphoric acid, and phosphate.

Polymer micelle 100 is included in the proton-conductive polymer in an amount of 5 to 50 parts by weight based on 100 parts by weight of the proton-conductive polymer. When polymer micelle 100 is included in an amount of less than 5 parts by weight, it may have little effect, while when in an amount of more than 50 parts by weight, it is practically impossible to prepare.

The polymer electrolyte membrane is prepared as follows: a vinyl-based monomer, an anionic surfactant, and a radical polymerization initiator are mixed in water to prepare an emulsion polymerization solution; a proton-conductive polymer membrane is dipped in the emulsion polymerization solution to swell the membrane; and an emulsion polymerization of the monomer embedded inside the swelled proton-conductive polymer membrane is performed to form a polymer micelle.

The anionic surfactant of the emulsion polymerization solution may include at least one selected from the group consisting of an alkyl fatty acid salt including a C1 to C20 alkyl, an alkylsulfonate including a C1 to C12 alkyl, an alcohol sulfuric acid ester salt including a C1 to C12 alkyl, an alkyl arylsulfonate including a C1 to C12 alkyl, and combinations thereof.

The radical polymerization initiator is not specifically limited to, but may be selected from the group consisting of a peroxide-based compound, a hydroperoxide-based compound, an azo-based compound, and combinations thereof.

The emulsion polymerization is performed while dipping the proton-conductive polymer membrane in the emulsion polymerization solution at the temperature of 0 to 50° C. for between 1 to 10 hours.

According to another embodiment according to the principles of the present invention, the membrane-electrode assembly is constructed with the above polymer electrolyte membrane and an anode and a cathode disposed on each side of the polymer electrolyte membrane.

Each of the cathode and the anode includes an electrode substrate and a catalyst layer. The catalyst layer may contain platinum, ruthenium, osmium, platinum-ruthenium alloys, platinum-osmium alloys, platinum-palladium alloys, platinum-M alloys, or combinations thereof, where M is a transition element selected from the group consisting of Ga, Ti, V, Cr, Mn, Fe, Co, Ni, Cu, Zn, Sn, Mo, W, Rh, and combinations thereof.

According to one embodiment, platinum-based catalysts may contain Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and a combination thereof.

The metal catalyst layer may be supported on a carrier or may be a black type catalyst that is not supported on a carrier. The carrier may include carbon-based materials such as graphite, denka black, ketjen black, acetylene black, carbon nanotube, carbon nano fiber, carbon nano wire, carbon nano ball, or activated carbon, or an inorganic particulate such as alumina, silica, zirconia, or titania may also be used. A carbon-based material is generally used as a carrier.

The electrode substrate functions to support an electrode, and also to spread a fuel or an oxidant to the catalyst layers to help the fuel and the oxidant to easily approach the catalyst layers. For the electrode substrates, a conductive substrate is used, for example carbon paper, carbon cloth, carbon felt, or metal cloth (a porous film including a metal cloth fiber or a metalized polymer fiber), but the present invention is not limited thereto.

The electrode substrate may be treated with a fluorine-based resin to be water-repellent, which can prevent the deterioration of reactant diffusion efficiency due to water generated during fuel cell operation. The fluorine-based resin includes polyvinylidene fluoride, polytetrafluoroethylene, fluorinated ethylene propylene, polychlorotrifluoroethylene, fluoroethylene polymers, and so on.

A microporous layer (MPL) can be added between the aforementioned electrode substrate and the catalyst layer to increase reactant diffusion efficiency. The microporous layer generally includes conductive powders with a particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof. The microporous layer is formed by coating a composition including a conductive powder, a binder resin, and a solvent on the conductive substrate. The binder resin may include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent may include, but is not limited to, an alcohol such as ethanol, isopropylalcohol, n-propylalcohol, butanol, and so on, water, dimethyl acetamide, dimethyl sulfoxide, or N-methylpyrrolidone. The coating method may include, but is not limited to, screen printing, spray coating, doctor blade methods, gravure coating, dip coating, silk screening, painting, and so on, depending on the viscosity of the composition.

Figure 2:
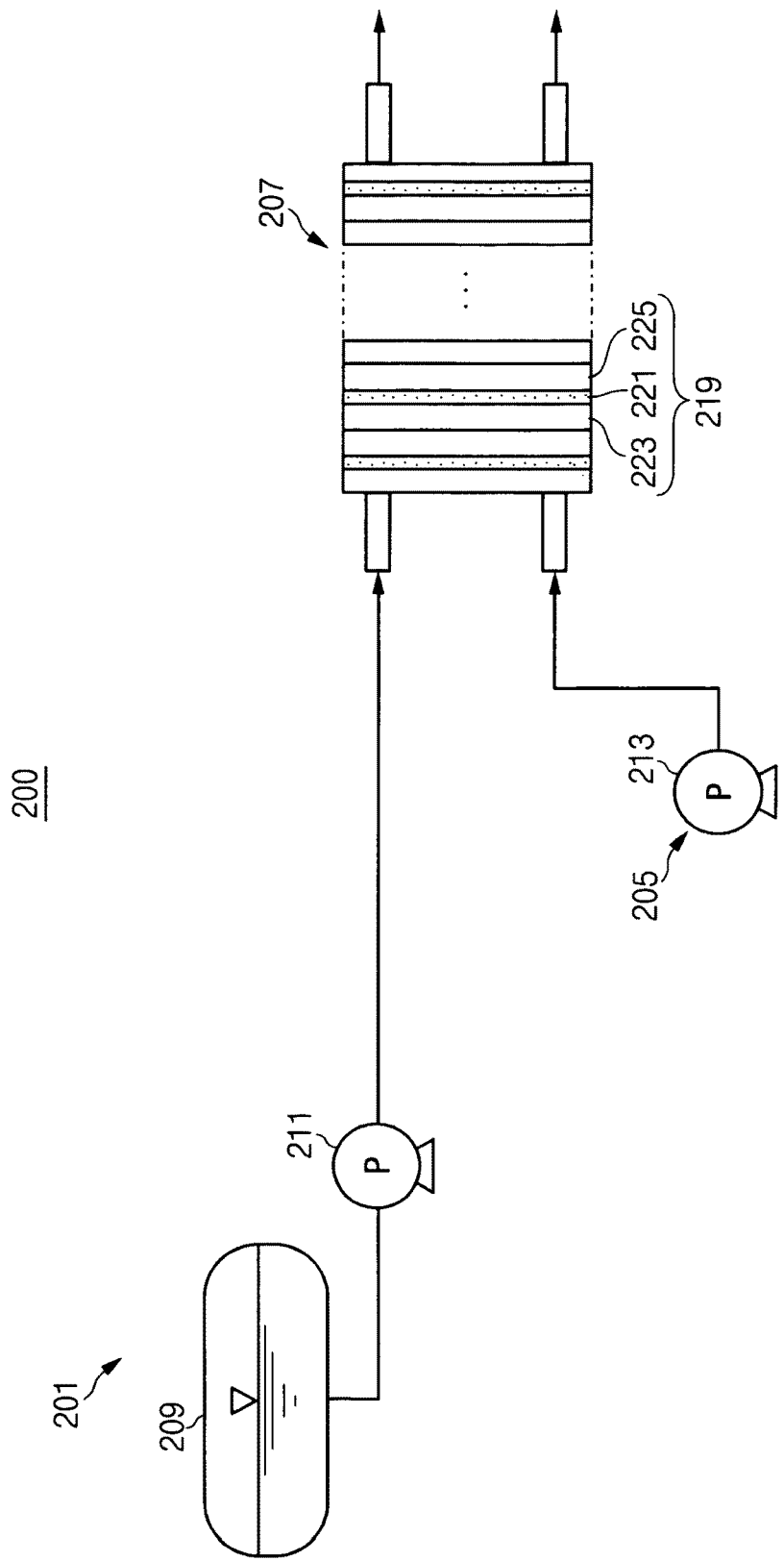
FIG. 2 is a single line schematic diagram illustrating the structure of a fuel cell system constructed as another embodiment according to the principles of the present invention.
Figure 3:
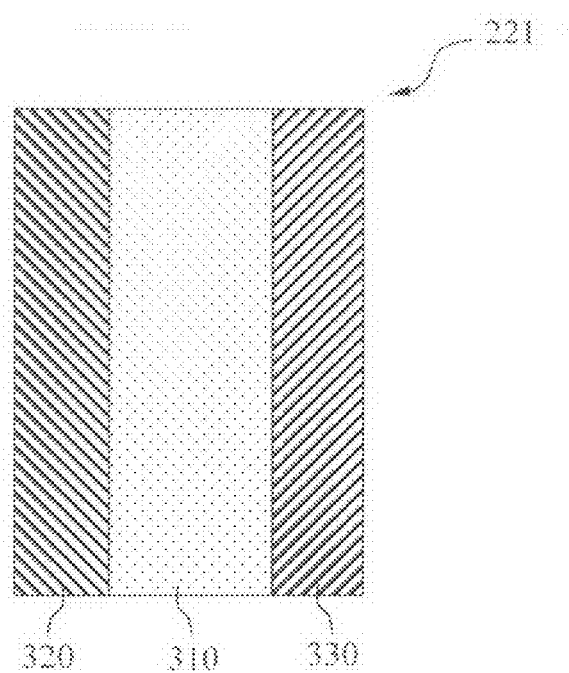
FIG. 3 is a schematic diagram illustrating the structure of a membrane-electrode assembly incorporating the polymer electrolyte membrane as still another embodiment according to the principles of the present invention.
Figure 4:
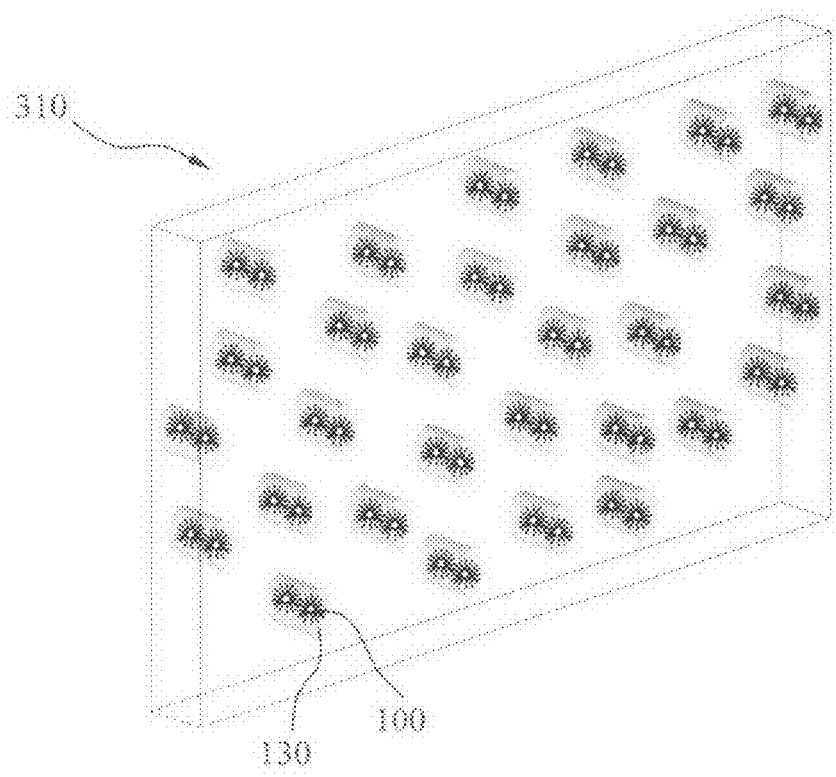
FIG. 4 is a schematic diagram illustrating the structure of the polymer electrolyte membrane as the embodiment according to the principles of the present invention.

FIG. 2 shows a single line schematic diagram of a fuel cell system constructed as an embodiment according to the principles of the present invention, that will be described in detail with reference to this accompanying drawing as follows. FIG. 2 illustrates a fuel cell system 200 wherein a fuel and an oxidant are respectively provided to electricity generating element 219 through pumps 211 and 213, but the present invention is not limited to such structure. Alternatively, the fuel cell system of the present invention may be constructed as a structure wherein a fuel and an oxidant are provided in a diffusion manner. FIG. 3 shows a schematic diagram illustrating the structure of a membrane-electrode assembly constituting the fuel cell system as shown in FIG. 2. FIG. 4 shows a schematic diagram illustrating the structure of the polymer electrolyte membrane as an embodiment according to the principles of the present invention.

Fuel cell system 200 is constructed with a stack 207 including at least one electricity generating element 219 that generates electrical energy through an electrochemical reaction between a fuel and an oxidant, a fuel supplier 201 for supplying a fuel to electricity generating element 219, and an oxidant supplier 205 for supplying an oxidant to electricity generating element 219.

In addition, fuel supplier 201 is equipped with a tank 209 that stores a fuel, and a pump 211 that is connected therewith. Fuel pump 211 supplies the fuel stored in tank 209 with a pumping power.

The fuel includes liquid or gaseous hydrogen, or a hydrocarbon-based fuel such as methanol, ethanol, propanol, butanol, or natural gas.

Oxidant supplier 205 of fuel cell system 200, which supplies the electricity generating element 219 with an oxidant, is equipped with at least one pump 213 for supplying an oxidant with a pumping power.

Electricity generating element 219 is constructed with a membrane-electrode assembly 221 that oxidizes hydrogen or the fuel and reduces the oxidant, and separators 223 and 225 that are respectively positioned on opposite sides of membrane-electrode assembly 221 and supply hydrogen or the fuel, and the oxidant. As shown in FIG. 3, membrane-electrode assembly 221 is constructed with the aforementioned polymer electrolyte membrane 310, and a cathode 330 and an anode 320 disposed on opposite sides of polymer electrolyte membrane 310. The electricity generating element generates electricity through oxidation of a fuel and reduction of an oxidant.

The following examples illustrate the present invention in more detail. It is understood, however, that the present invention is not limited by these examples.

Example 1

30 g of styrene, 0.5 g of azobisisobutyronitrile (AIBN) as a radical initiator, and 10 g of dodecylbenzenesulfonic acid (DBSA) as an anionic surfactant were put in 200 g of deionized water (DW) and mixed therewith, thereby preparing an emulsion polymerization solution.

Then, a 0.005 inch thick NAFION 115 (NAFION® 115) membrane (Dupont Co.) was dipped into the polymerization solution, so that it can be sufficiently swollen by the emulsion polymerization solution and permeated thereby.

The swollen NAFION membrane was left in the emulsion polymerization solution at 30° C. for 10 hours and then was washed, thereby preparing a polymer electrolyte membrane.

Comparative Example 1

The same NAFION 115 (NAFION® 115) membrane as in Example 1 was used as a polymer electrolyte membrane.

Then, the polymer electrolyte membranes for a fuel cell fabricated according to Example 1 and Comparative Example 1 were evaluated regarding proton conductivity, swelling characteristics, and permeability by the over-crossed amount of methanol.

The proton conductivity was measured by using a 2-probe type impedance analyzer (IM6, BAS-Zahner Instruments), and the swelling characteristic was estimated by measuring weight change of distilled water after swelling. In addition, the permeability was estimated by measuring the over-crossed amount of methanol cross-over with a refractometer.

The results are provided in the following Table 1.

TABLE 1

| | Example 1 | Comparative Example 1 |
|---|---|---|
| Proton conductivity (S/cm) | 0.19 | 0.1 |
| Swelling characteristic (%) | 10 | 15 |
| Permeability ($cm^2$/s) | $1.51.3 \times 10^{25}$ | $1.3 \times 10^{26}$ |

As shown in Table 1, the polymer electrolyte membrane of Example 1 turned out to have more excellent proton conductivity and swelling characteristic, and also have less methanol permeability than that of Comparative Example 1.

Therefore, the polymer electrolyte membrane according to the principles of the present invention, which is constructed with a polymer micelle including a polymer and a surfactant surrounding the polymer inside a hydrophilic channel, can decrease cross-over of a fuel and solve the lack of water therein since the surfactant has high affinity to water.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for manufacturing a polymer electrolyte membrane, comprising:
  preparing an emulsion polymerization solution by mixing a vinyl-based monomer, an anionic surfactant, and a radical polymerization initiator in water;
  dipping a proton-conductive polymer membrane in the emulsion polymerization solution to swell the membrane; and
  performing an emulsion polymerization of the monomer embedded inside the swelled proton-conductive polymer membrane to form a polymer micelle.

2. The method of claim 1, comprised of the vinyl-based monomer comprising one selected from the group consisting of styrene, alpha-methyl styrene, 4-methylstyrene, 3,4-dichlorostyrene, methyl metacrylic acid, sodium acrylamide-tert-butyl sulfonate, polyaniline, polypyrrol, poly thiophene, and combinations thereof.

3. The method of claim 1, comprised of the anionic surfactant comprising at least one selected from the group consisting of an alkyl fatty acid salt including a C1 to C20 alkyl, an alkylsulfonate including a C1 to C12 alkyl, an alcohol sulfuric acid ester salt including a C1 to C12 alkyl, an alkyl arylsulfonate including a C1 to C12 alkyl, and combinations thereof.

4. The method of claim 1, comprised the radical polymerization initiator comprising one selected from the group consisting of a peroxide-based compound, a hydroperoxide-based compound, an azo-based compound, and combinations thereof.

5. The method of claim 1, comprised of performing the emulsion polymerization at 0 to 50° C. while dipping the proton-conductive polymer membrane in the emulsion polymerization solution.

6. A membrane-electrode assembly for a fuel cell, comprising:
  a polymer electrolyte membrane comprising a polymer micelle inside a hydrophilic channel of a proton-conductive polymer membrane, with the polymer micelle comprising a vinyl-based polymer obtained from polymerization of vinyl-based monomers and an anionic surfactant surrounding the vinyl-based polymer;
  a cathode formed on one side of the polymer electrolyte membrane; and
  an anode formed on the other side of the polymer electrolyte membrane.

* * * * *